United States Patent

[11] 3,604,907

| [72] | Inventor | Charles R. Wesner<br>Crozet, Va. |
|---|---|---|
| [21] | Appl. No. | 15,697 |
| [22] | Filed | Mar. 2, 1970 |
| [45] | Patented | Sept. 14, 1971 |
| [73] | Assignee | Sperry Rand Corporation |

[54] STEERING COMMAND COMPUTER FOR NAVIGABLE CRAFT
6 Claims, 3 Drawing Figs.

[52] U.S. Cl................................................ 235/150.2,
244/77 S, 114/144 R, 318/580, 318/586, 318/588,
318/619, 318/624, 235/150.1
[51] Int. Cl........................................................ B63h 25/04,
G05b 13/02
[50] Field of Search...................................... 244/76 R,
77 B, 77 S; 318/489, 580, 586, 588, 619, 624;
235/150.2, 150.25, 150.26, 150.27; 114/144 R

[56] References Cited
UNITED STATES PATENTS

| 2,340,175 | 1/1944 | Chance | 114/144 |
| 3,034,032 | 5/1962 | McWilliams | 244/77 S |
| 3,133,520 | 5/1964 | Bentkowsky et al. | 114/144 |
| 3,436,035 | 4/1969 | Priestley | 244/77 S |
| 3,505,577 | 4/1970 | Hirokawa | 114/144 |
| 3,517,285 | 6/1970 | Kundler | 318/588 |

*Primary Examiner*—Eugene G. Botz
*Assistant Examiner*—R. Stephen Dildine, Jr.
*Attorney*—S. C. Yeaton ABSTRACT: Computer apparatus for use in navigable craft for providing a steering command signal in response to a heading error signal. A threshold circuit provides a first signal when the magnitude of the heading error signal is not in excess of a threshold and a second signal when the magnitude thereof exceeds the threshold. Gain-controlling circuits are included for effecting a first computer gain in response to the second signal and a lower gain in response to the first signal. Means for adjusting the threshold in accordance with yawing motion of the craft are included.

STEERING COMMAND COMPUTER FOR NAVIGABLE CRAFT

BACKGROUND OF THE INVENTION

1. Field of the Invention

The present invention pertains to steering command computers for navigable crafts, particularly of the marine-surface-vessel type.

2. Description of the Prior Art

Navigable crafts, particularly of the marine-surface-vessel type, are often equipped with automatic steering apparatus that provides a steering command signal in response to a heading error signal from the directional reference system of the ship. The steering command signal may, for example, be the rudder order signal applied to the rudder-positioning servo of the vessel for steering the craft.

In calm seas, the steering apparatus of the ship may maintain a steady heading in accordance with a commanded course. However, in rough seas, caused for example by adverse weather, the vessel may experience an oscillatory yawing motion through an angle dependent on the severity of the seas. As a result, the heading error signal from the directional reference system of the ship will vary in amplitude in a corresponding manner. Since the ship's rudder-positioning servo is responsive to the heading error signal, the rudder will be driven in an oscillatory manner corresponding to the yawing motion of the vessel.

The yawing motion, for most ships, occurs at frequencies at which the corresponding rudder motion is ineffective in steering the vessel. Hence, the excessive rudder motion experienced under the conditions described serves primarily to shorten the life of the components of the rudder servomechanism because of excessive wear and to increase the drag on the ship, hence adversely affecting fuel consumption thus increasing the operating costs of the craft.

A prior art solution to the problem is to introduce a dead zone of operation into the system in accordance with the yaw angle of the ship. When the ship is yawing within the expected angle, steering commands are disengaged from the rudder servo hence maintaining the rudder in a fixed position. When the ship's yawing exceeds the expected angle, the steering command is applied to the rudder servo, thus bringing the ship back to a heading within the yaw angle at which time the system is again disengaged. Thus it may be appreciated that accurate course keeping is not maintained since there is no steering control of the ship when the ship's heading is within the expected yaw angle. Additionally, a persistent course drift may maintain the heading of the vessel at an edge of the yaw zone rather than at the center thereof as is desirable for accurate course keeping.

Another possible prior art solution to the problem discussed above is to filter the oscillatory yaw frequencies from the heading error signal thus minimizing the excessive motion of the rudder. Low pass filters would ordinarily be utilized for this purpose. Application of such filters with sufficiently low cutoff frequencies to be effective, introduces excessive lag into the ship's steering servosystem precipitating unstable servo operation and impairing the course-keeping accuracy thereof.

SUMMARY OF THE INVENTION

The present invention provides a steering command computer for use, for example, in marine surface vessels for providing a steering command signal in response to a heading error signal. The steering command may comprise a rudder order signal. A threshold circuit responsive to the heading error signal provides a first signal when the magnitude of the heading error signal is not in excess of a threshold and second signal when the magnitude thereof exceeds the threshold. Gain-controlling means are included for effecting a first computer gain in response to the second signal and a lower gain in response to the first signal. Means for adjusting the threshold in accordance with the severity of the seas are included. The threshold is adjusted to correspond to the amplitude of the yawing motion experienced by the vessel in response to the condition of the seas. The threshold is set to a magnitude just larger than the amplitude of the variations in the heading error signal caused by the yawing motion.

Thus the gain of the steering command computer is high when the heading of the vessel deviates from the normal yaw angle hence maintaining the heading within the yaw zone. When the heading of the ship is within the normal yaw angle, the gain of the computer is low, thus maintaining accurate course-keeping control with respect to the prior dead zone configuration previously discussed while reducing the excessive rudder motion that is the primary detriment of prior automatic pilots for marine vessels.

DESCRIPTION OF THE PREFERRED EMBODIMENT

Figure 1A:
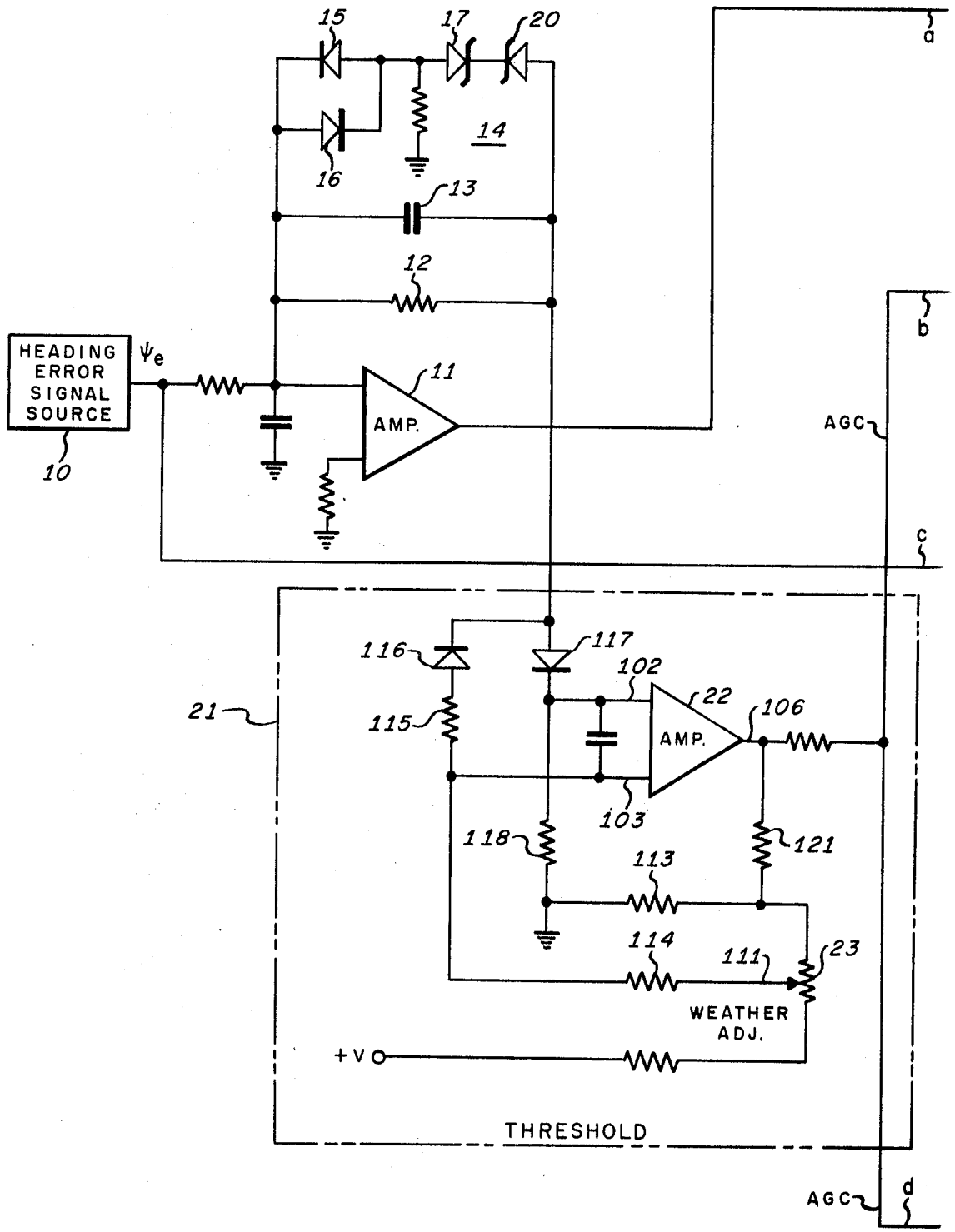
FIGS. 1a–1c are schematic wiring diagrams of a steering command computer embodying the principles of the present invention.
Figure 1B:
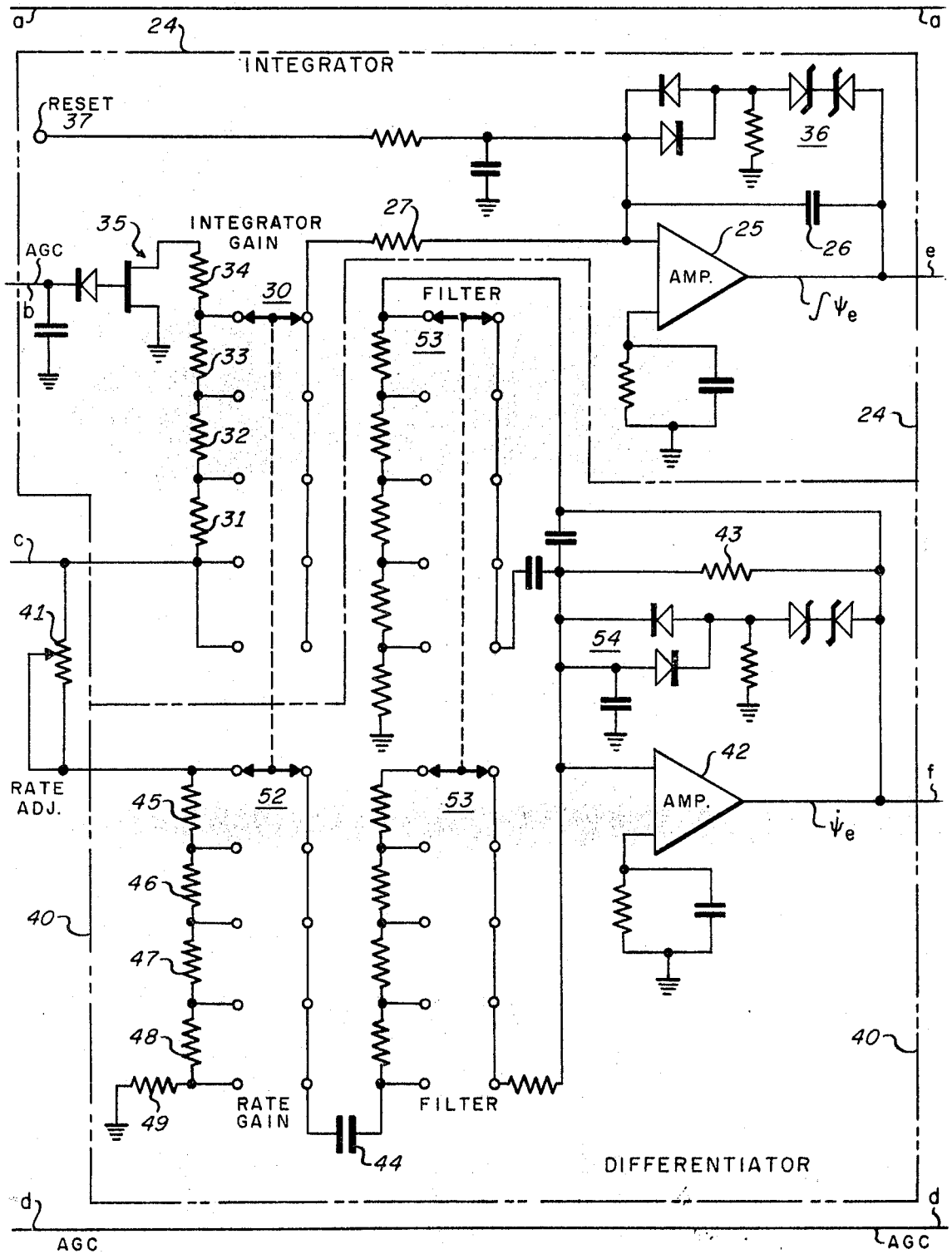
Figure 1C:
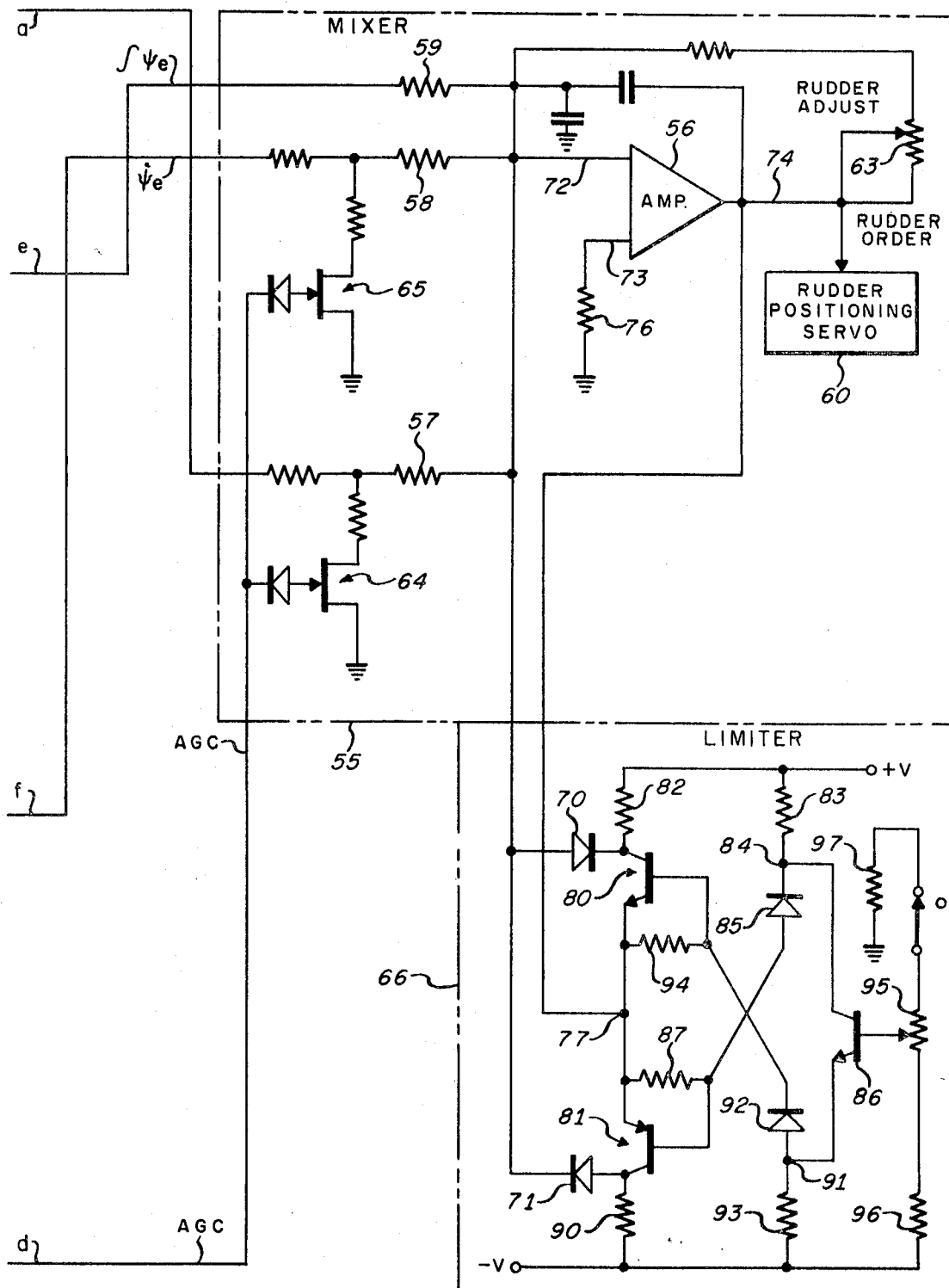

Referring to FIG. 1, a source 10 provides the heading error signal, $\psi_e$, to the steering command computer of the present invention. The heading error signal source 10 may comprise the directional reference system of the ship which might include a suitable gyrocompass system. The heading error signal is applied as an input to an operation amplifier 11. The output of the amplifier 11 is fed back to its input via a resistor 12 and a capacitor 13. The resistor 12 and the capacitor 13 provide a low-pass filtering function for the signal $\psi_e$. The heading error signal is processed by the filter to remove high frequency yaw signals that might result in excessive and wasteful motion of the rudder. It will be appreciated, however, that the passband of the filter is chosen sufficiently wide so that only negligable lag is introduced into the system, hence maintaining servo stability. It may thus be appreciated that yaw signals occurring at low frequencies that may produce excessive and wasteful rudder motion will lie within the passband of the filter and hence be transmitted therethrough. The amplifier and filter are of conventional design and equivalents thereof may be utilized to the same effect.

The output of the amplifier 11 is also connected back to its input via a limiter 14 which comprises diodes 15 and 16 as well as zener diodes 17 and 20. The limiter 14 is of conventional design and is utilized to limit the signals associated with the amplifier 11 to protect the components thereof.

The amplified and filtered heading error signal provided by the amplifier 11 is applied as an input to a threshold circuit 21. The heading error signal may be a bipolar signal since it may have either a positive or negative polarity in accordance with the sense of the yaw deviation of the ship from its commanded course. The threshold circuit 21 provides a corresponding bipolar threshold. An operational amplifier 22 provides a positive signal whenever the absolute value of the magnitude of the heading error signal is not in excess of the absolute value of the threshold. The amplifier 22 provides a negative signal whenever the absolute value of the magnitude of the heading error signal exceeds the absolute value of the threshold. A potentiometer 23 adjusts the bipolar positive and negative thresholds in a symmetrical manner. Adjustments of the potentiometer 23 may provide a range of thresholds corresponding to a range of yaw motions from ±1/3° to ±9° in a manner to be explained.

The potentiometer 23 is connected between a supply voltage +V and one terminal of a first feedback resistor 113. The other terminal of the feedback resistor 113 is connected to ground potential. Series-connected resistors 114 and 115 are coupled between the wiper arm 111 of the potentiometer 23 and the anode of a diode 116. The input to the threshold circuit 21 is connected to the junction of series-connected diodes 116 and 177. A bias resistor 118 is connected between the cathode of the diode 117 and ground potential. The amplifier 22 has a first input terminal 102 connected to the junction between the cathode of the diode 117 and the bias resistor 118 and a second input terminal 103 coupled to the junction between the series-connected resistors 114 and 115. The output terminal 106 of the operational amplifier 22 is connected to one terminal of a second feedback resistor 121. The other terminal of the resistor 121 is connected to the common terminal of the potentiometer 23 and the first feedback resistor 113. A positive reference voltage is established by adjusting the position of the wiper 111 of the potentiometer 23. When there is no input signal present at the input terminal to the circuit 21, current will flow from the supply voltage, +V, through the wiper 111 establishing a reference voltage, and the through the series resistors 114 and 115, the diode 116 and back through the signal source to the circuit 21. In the operational amplifier 22, the voltage on the input terminal 103 will be more positive than the voltage on the input terminal 102 forcing the output terminal 106 to a positive value. The output terminal 106 will remain at a positive value for all positive or negative voltage signals applied to the input to the circuit 21 having an absolute value equal to or less than the reference voltage at the wiper arm 111.

Applying a positive voltage signal to the input to the circuit 21 having a magnitude greater than that of the reference voltage at the wiper arm 111 will reverse-bias the diode 116 thus inhibiting current flow therein and in the resistor 115. The terminal 103 will assume the voltage level of the reference voltage at the wiper arm 111 and the terminal 102 will assume a positive voltage level slightly less than the signal present at the input to the circuit 21 due to the voltage decrease across the diode 117. The terminal 102 will now be at a more positive potential than the terminal 103 and the terminal 106 will change its state to a negative value.

The feedback resistors 113 and 121 form a voltage divider that applies a percentage of the negative voltage output on the terminal 106 to the potentiometer 23 which reduces the reference voltage at the wiper 111 and hence at the terminal 103. Therefore, the positive signal applied to the input to the circuit 21 will have to decrease to a level below that which triggered the change of state of the threshold circuit 21 in order to effect a return to its initial state. The magnitude of this hysteresis is determined by the resistance values of the resistors 113 and 121.

With the threshold circuit 21 in its initial state, a negative voltage signal applied to its input having an absolute value greater than that of the reference voltage of the wiper 111 will reverse-bias the diode 117 thus inhibiting current flow therein and in the resistor 118. The terminal 102 will assume ground potential and the terminal 103 will assume a negative voltage level determined by the diode 116 and the resistors 114 and 115. The terminal 102 will be more positive than the terminal 103 and the terminal 106 will change its state to a negative value.

The feedback resistors 113 and 121 apply a percentage of the negative voltage output on the terminal 106 to the potentiometer 23 which reduces the reference voltage at the wiper 111 and the terminal 103 becomes more negative. Therefore, a negative signal applied to the input to the circuit 21 will have to be less negative than that which triggered the change of state thereof. An economical threshold circuit 21 is thus provided comprising a single operational amplifier 22 which changes its output state whenever an applied bipolar input signal exceeds a reference voltage. Further, the reference voltage level for the bipolar input is controlled by a single adjustment.

Although the threshold circuit 21 is a nonconventional circuit providing unique advantages, it may be appreciated that a conventional functionally equivalent circuit may be utilized in the present invention to the same effect.

As well as providing the heading error signal to the amplifier 11, the source 10 provides the heading error signal to an integrator 24. The integrating components of the circuit 24 include an operational amplifier 25, an integrating capacitor 26 and an integrating resistor 27. The heading error signal is applied to the integrating components via a five-position integrator-gain-controlling switch 30. Series-connected resistors 31, 32, 33 and 34 serially coupled with a field effect transistor 35 comprise a voltage divider to which the heading error signal $\psi_e$ is applied. The gain of the integrator 24 is controlled by the switch 30 by tapping off a fraction of the heading error signal in accordance with the position of the switch wiper. The switch 30 is positioned in accordance with the dynamic characteristics of the vessel in which the computer of the present invention is incorporated and in accordance with the loading of the ship.

The transistor 35 functions as the gain-controlling element of the integrator 24 in accordance with the teachings of the present invention. The transistor 35 functions as a switch whose gate electrode is coupled to receive the gain-controlling signal from the threshold circuit 21. When the heading error signal is less than the threshold and the output of the threshold circuit 21 is a positive signal, the transistor 35 is rendered conductive thereby effecting the low-gain mode for the integrator 24. Conversely, when the heading error signal exceeds the threshold, the output of the signal from the threshold circuit 21 is a negative signal which renders the transistor 35 nonconductive thus effecting the high-gain mode for the integrator 24.

A limiter circuit 36 is connected in shunt with the amplifier 26 and operates in a manner and is included for reasons identical to those discussed with respect to the limiter 14.

The integrator 24 may be reset to a reference condition by a signal on a reset line 37. The integrator 24 is usually reset when a change in course is commanded.

It may be appreciated that the integrator 24 is of conventional design and equivalents thereof may be utilized to the same effect.

As previously discussed, the source 10 provides the amplified and filtered heading error signal via the amplifier 11 as well as the integral of the heading error signal via the integrator 24. The source 10, in addition, provides the heading error rate via a differentiator 40. The heading error signal is applied as an input to the differentiator 40 via a rate-adjust potentiometer 41. The potentiometer 41 is utilized to trim the gain of the error rate channel 40 of the computer. An operational amplifier 42, a resistor 43 and a capacitor 44 provide the differentiating function for the differentiator channel 40.

The heading error signal from the potentiometer 41 is applied to a tapped voltage divider comprised of resistors 45, 46, 47, 48 and 49. The taps of the voltage divider are selectively connected to the wiper of a five-position switch 52. The switch 52 selects the gain of the differentiator in accordance with the dynamic characteristics of the ship in which the computer of the present invention is incorporated and in accordance with the ship's loading.

The signal provided by the switch 52 is applied via the differentiating capacitor 44 to an adjustable low-pass filter 53. The passband of the filter 53 may be adjusted in accordance with the frequencies of the yaw signals that the system might encounter dependent on the ship in which the computer is installed.

The output of the adjustable filter 53 is applied as an input to the amplifier 42 across which the differentiating resistor 43 is connected. A limiter 54 is connected across the input and output terminals of the amplifier 42 to limit the signals therein in a manner an for the reasons given with respect to the limiter 14.

It may be appreciated that the differentiating and filtering circuits 40 are of conventional design and equivalents thereof may be utilized to the same effect.

The amplified and filtered heading error signal provided by the amplifier 11, the integrated heading error signal provided by the integrator 24 and the differentiated and filtered heading error signal provided by the differentiator 40 are applied as inputs to a mixer circuit 55. The mixer circuit 55 may be of conventional summing network comprised of an operational amplifier 56 and input resistors 57, 58 and 59 to which the error, derivative and integral signals are applied, respectively. The output of the amplifier 56 provides the steering command signal, for example the rudder order signal $\delta_o$, to the rudder-positioning servo 60 of the vessel. A rudder adjust potentiometer 63 connected in shunt with the amplifier 56 provides an overall gain adjustment of the ship's steering servomechanism of which the computer of the present invention is a component in accordance with the rudder ratio of the craft.

Transistor switches 64 and 65, connected respectively to the error input and rate input of the summing amplifier 56, function as gain-controlling elements in a manner identical to that described with respect to transistor switch 35. The gates of the transistors 64 and 65 are connected to the output of the threshold circuit 21 to provide gain control in accordance with the teachings of the present invention.

A limiter circuit 66 is connected between the output of the amplifier 56 and its input to limit the amplitude of the rudder order signal applied to the rudder-positioning servo 60.

The limiter circuit 66 has the anode of an input diode 70 and the cathode of an input diode 71 coupled to an input terminal 72 of the operational amplifier 56. The input terminal 73 of the operational amplifier 56 is coupled to ground potential via a bias resistor 76 and the output terminal 74 thereof is coupled to the junction 77 of the emitters of limiting transistors 80 and 81. A collector resistor 82 is connected between the positive supply voltage, +V, and the terminal common to the cathode of the input diode 70 and the collector of the limiting transistor 80. A collector-resistor 83 is connected between the positive supply voltage, +V, and a terminal 84 common to the cathode of a diode 85 and the collector of a transistor 86. Connected to the junction terminal of a resistor 87 and the base of the limiting transistor 81 is the anode of the diode 85. The limiting transistor 81 has the bias resistor 87 connected between its base and emitter. A collector-resistor 90 is connected between the negative supply voltage, −V, and the terminal common to the anode of the input diode 71 and the collector of the limiting transistor 81. The negative supply voltage. −V, is also coupled to a terminal 91 common to the anode of a diode 92 and the emitter of the transistor 86 through an emitter resistor 93. The cathode of the diode 92 is connected to the junction terminal of a resistor 94 and the base of the limiting transistor 80. The limiting transistor 80 has the bias resistor 94 connected between its base and emitter.

The negative supply voltage, −V, is also applied to a first terminal of a potentiometer 95 through a resistor 96. A second terminal and the wiper arm of the potentiometer 95 are coupled to ground potential through a resistor 97 and to the base of the transistor 86, respectively.

A negative bias applied to the base of the transistor 86 through the resistor 96 and the potentiometer 95 controls the current flow from the positive voltage supply, +V, through the resistor 83, transistor 86 and resistor 93 to the negative supply voltage, −V. Varying the negative bias by adjusting the wiper arm of the potentiometer 95 controls the positive reference voltage at the terminal 84 and the negative reference voltage at the terminal 91 which are equal in magnitude.

An output signal from the terminal 74 of the operational amplifier 56, applied to the terminal 77 of the limiter 66 that is at or near ground potential, does not affect the base current of the transistors 80 or 81 to any appreciable extent. Therefore, the transistors 80 and 81 are held near their cutoff condition. A positive output signal from the terminal 74 applied to the terminal 77 sufficiently more positive than the positive reference voltage at the terminal 84 will produce a base current in the limiting transistor 81 and the diode 85 thereby switching the limiting transistor 81 to its "ON" condition. Any further increase in the positive voltage level of the output signal from the operational amplifier 56 is inhibited by the current flow through the limiting transistor 81 and the diode 71 to the input terminal 72. As a result, the output voltage signal is effectively limited to a value slightly higher than the positive reference voltage at the terminal 84. The difference between this limiting value and the reference voltage is determined by the base-emitter drop of the transistor 81 and the diode 85.

Similarly, a negative output signal from the terminal 74 applied to the terminal 77 sufficiently more negative than the negative reference voltage at the terminal 91 will produce a base current in the limiting transistor 80 and the diode 92 whereby switching the limiting transistor 80 to its "ON" condition. Any further increase in the absolute value of the negative voltage level of the output signal from the operation amplifier 56 is inhibited by the current flow from the input terminal 72 through the diode 70 and the limiting transistor 80 to the output terminal 74. The absolute value of the negative output voltage signal is maintained at a level somewhat greater than the negative reference voltage at the terminal 91. The diode drop in the transistor 80 and the diode 92 determines the difference in magnitude between the negative reference voltage and the limited voltage at the terminal 74 of the operational amplifier 56.

Therefore, the limiter circuit 66 limits the bipolar signal output from the operational amplifier 56 and also provides a single adjustment to simultaneously vary the opposite polarity reference voltages. Further, the limiting transistors 80 and 81, by operating in a mode that does not produce voltage gain, do not contribute any instability to the operational amplifier 56.

Although the limiter circuit 66 is a nonconventional circuit providing unique advantages, it may be appreciated that a conventional functionally equivalent circuit may be utilized in the present invention to the same effect.

In operation of the computer illustrated in FIG. 1, the switches 30 and 52, which are ganged together, are positioned to adjust the respective gains of the integral and rate channels of the computer in accordance with the dynamic characteristics of the ship in which the system is installed and in accordance with the ship's loading. In addition, the switch 53 is positioned to adjust the time constant of the filter associated with the differentiator channel 40 in accordance with these parameters.

The weather adjust potentiometer 23 is then set in accordance with the amplitude of the yawing motion experienced by the ship in response to the condition of the seas.

When the heading of the ship is within the preset yaw zone the amplifier 22 of the threshold circuit 21 provides a positive signal that renders the gain-controlling transistors 35, 64 and 65 conductive. Thus the respective gains of the integrator, error and rate channels are set to the low-gain mode. The ship can thus experience normal yawing amplitudes without causing excessive motion of the rudder. Since nonzero gain is provided in the channels of the steering command computer of the present invention when in the low-gain mode, course keeping accuracy is efficaciously maintained.

When the heading of the ship deviates from the preset yaw zone, the heading error signal provided to the threshold circuit 21 exceeds the preset threshold thus causing the amplifier 22 to provide a negative signal. The negative signal renders the gain-controlling transistors 35, 64 and 65 nonconductive thus effecting the high-gain mode of the system. The heading of the ship is therefore rapidly corrected until the ship's heading is once again within the yaw zone determined by the setting of the weather adjust potentiometer 23.

It has been ascertained that a ratio of 5 to 1 between the high-gain and low-gain modes, respectively, provides a significant reduction in excessive rudder motion compared to prior configurations while maintaining adequate course-keeping accuracy.

It may be appreciated that the heading of the ship incorporating the present invention will be primarily confined to the preset yaw zone, for most sea conditions, only occasionally deviating therefrom. When the deviation occurs the high-gain mode is effective to rapidly restore the heading back to within the zone. In addition, the low-gain mode is effective in maintaining the ship's heading near the center of the yaw zone which is desirable for accurate course-keeping.

It may also be appreciated that the heading error signal provided by the source 10 is representative of the sum of the heading error and the yaw angle of the ship.

Although the computer of the present invention includes a rate channel to provide rapid response to heading deviations and an integral channel to provide long term heading corrections, it may be appreciated that the teachings of the present invention are applicable to steering command computers that may include fewer than the channels included in the preferred embodiment described above.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In apparatus for steering a navigable craft
   first means for providing a heading error signal,
   threshold means coupled to said first means for providing a first signal when the magnitude of said heading error signal is not in excess of a threshold and a second signal when the magnitude thereof exceeds said threshold,
   said threshold means including means for adjusting said threshold, and
   second means coupled to said first means for providing a steering command signal in response to said heading error signal,
   said second means including gain-controlling means coupled to receive said first and second signals for effecting a first gain in response to said second signal and a nonzero gain lower than said first gain in response to said first signal.

2. In the apparatus recited in claim 1 in which
   said heading error signal is a bipolar signal, and
   said threshold is a bipolar threshold,
   said threshold means providing said first signal when the absolute value of said heading error signal is not in excess of the absolute value of said threshold and said second signal when the absolute value thereof exceeds the absolute value of said threshold.

3. In the apparatus recited in claim 1 in which said second means further includes
   differentiator means for providing a signal representative of the derivative of said heading error signal,
   integrator means for providing a signal representative of the integral of said heading error signal, and
   mixing means for mixing said heading error signal, derivative signal and integral signal to provide said steering command signal.

4. In the apparatus recited in claim 3 in which
   said second means further includes means for conducting said heading error signal to said mixing means, and
   said gain-controlling means comprises first, second and third gain-controlling elements coupled, respectively, to said conductor means, differentiator means and integrator means for effecting in said respective means said first gain in response to said second signal and said lower gain in response to said first signal.

5. In the apparatus recited in claim 4 in which
   said heading error signal is a bipolar signal,
   said threshold is a bipolar threshold,
   said threshold means providing said first signal when the absolute value of said heading error signal is not in excess of the absolute value of said threshold and said second signal when the absolute value thereof exceeds the absolute value of said threshold, and
   further including means coupled to said second means for limiting the magnitude of said steering command signal.

6. In the apparatus recited in claim 5 in which said mixing means comprises summation means responsive to said heading error signal, derivative signal and integral signal for generating the sum thereof to provide said steering command signal.